United States Patent [19]
Clerk

[11] 3,910,043
[45] Oct. 7, 1975

[54] HYDRAULIC TRANSMISSION CONTROL SYSTEM

[76] Inventor: Robert Cecil Clerk, Edison House, Fullerton Road, Queensway Industrial Estate, Glenrothes, Fife, Scotland

[22] Filed: July 23, 1974

[21] Appl. No.: 490,927

[30] Foreign Application Priority Data
July 23, 1973  United Kingdom............. 34909/73
July 18, 1974  United Kingdom............. 34909/74

[52] U.S. Cl. ................ 60/413; 60/414; 60/445; 60/449; 180/1 R
[51] Int. Cl.² ........................................ F15B 1/02
[58] Field of Search ............ 60/413, 414, 445, 449; 180/1 R, 66 R

[56] References Cited
UNITED STATES PATENTS
2,393,882  1/1946  Blair ........................... 60/445 X
3,298,174  1/1967  Stoyke et al. ................. 60/449 X
3,803,835  4/1974  Rodov ........................... 60/413 X

*Primary Examiner*—Edgar W. Geoghegan
*Attorney, Agent, or Firm*—Lerner, David, Littenberg & Samuel

[57] ABSTRACT

An energy-accumulating system for use in a motor vehicle is disclosed which includes a flywheel which rotates to store energy, a first hydraulic pump motor for rotating with the flywheel, ground engaging wheels driven by a second hydraulic pump motor, and computing valves interconnecting speed sensors and operator controls for controlling fluid flowing between the first and second pump motors. Details of the computing valves are also disclosed.

4 Claims, 12 Drawing Figures

HYDRAULIC TRANSMISSION CONTROL SYSTEM

This invention relates to control systems for vehicles, lifts, cranes or other machines characterised as having a controllable hydraulic energy-accumulator associated with a hydraulic motor or motors for driving the wheels, warps or shafts of said machine, the energy-accumulator being charged either by regenerative retardation of said machine and/or by an on-board prime mover or electric motor or by hydraulic power acquired and transmitted from a fixed or separately mobile hydraulic power servicing system.

It is well known for hydropneumatic potential energy accumulators to be output controlled by flow-control, needle and such valves which almost invariably cause substantial pressure drops, delivery loss and poor control modulation.

The object of the present invention is to provide a control system for a vehicle or other machine as above embodying a kinetic energy accumulator with hydraulic pump/motor output/input, which will ensure that the vehicle propulsion or machine driving power will be applied precisely as demanded or commanded by the operator's control pedals and/or levers, without any substantial control-attributable loss. To this end what I propose is a motive system, comprising a flywheel/hydraulic primary pump/motor, driving or being driven from a hydraulic primary motor/pump, chargeable from a primary pump driven by either an onboard prime mover or by a fixed or mobile service plant, and characterised by having a control system whereof the operator's command demand pedals and/or levers produce pressure/displacement signals which are collated, integrated and amplified to provide signal outputs to computing and/or controlling valve(s) associated with a displacement actuator of each primary pump/motor unit, said valve being also responsive to pressure in the hydraulic primary power circuit and/or to signals generated by a speed signal generator associated with each primary pump/motor unit whether such signal is corrected/amplified or not, the said valve(s) of the flywheel/pump complex acting as the master determinator of pressure in the hydraulic primary power circuit.

The preferred form of said valve is as described in my co-pending U.K. patent application No. 29689/73, where one end of said valve collects activates and distributes the signal pressures, and the other end serves as a computing pilot for the valve spool, being responsive to mechanical feed-back of and from the pump/motor displacement actuator, to analogue programme springs, and/or to one or more of the signals collected by the spool end body of the valve complex. The controls amplification pressure is derived from bleed reduction of pressure in the hydraulic primary power circuit and/or from a minikin ancillary pump with constant pressure relief.

The type of pump/motor displacement variance adopted assures self-relief, in that pressure in the hydraulic primary power circuit has effect to reduce displacement towards the centre zero stop or beyond to the overcentre stop in the case of a reversing motor/pump, and this is overruled and/or balanced by a hydraulic actuator energised via the said computing valve but capable of being relieved by a fast-acting pressure surge anxiliary valve or by a differential pressure "wheel slip" anxiliary valve as described in my co-pending U.K. patent application No. 34907/73.

The master computing valve associated with the flywheel pump/motor also serves to limit the attainable displacement inversely to pump speed above the rated speed for maximum displacement, so that attainable power is maximized. It also computes and controls the energy summation of fly wheel energy with the energy of the vehicle or other driven inertia so that the fly wheel reaches its maximum speed and energy when the driven inertia is at rest but is governed to substantially lower speed and energy when the vehicle or driven inertia increases speed towards its maximum, so that during subsequent regenerative retardation there is storage capacity for the recuperated energy and if recuperation falls short of the capacity, for make-up energy provided by the onboard prime-mover if such is fitted and controlled directly or indirectly from the master computing valve. If recuperated energy exceeds storage capacity the master computing valve reduces recuperation and applies a precisely appropriate pressure to the wheel brakes or other frictional retarding system.

"Reverse" drive is most conveniently achieved by the output drive motor displacement control going over centre to a fixed ("negative") displacement stop. As in forward running the power circuit pressure and therefore tractive torque is modulated by the operator's demand lever via the master computing valve which will exercise any necessary overriding correction.

When "Neutral" is selected all pumps/motors are inhibited from any displacement, and the operator's power command is referred directly to the prime-mover which may be run freely.

An example of a vehicle including an energy accumulator in accordance with the invention, ancillary elements and hydraulic circuits are illustrated in the accompanying drawings, in which:

FIG. 5 shows a modular computing control valve, of the type described in my co-pending U.K. patent application No. 29689/73 as applied to and shown inserted in the flywheel associated pump/motor in FIG. 5a;

Figure 1:
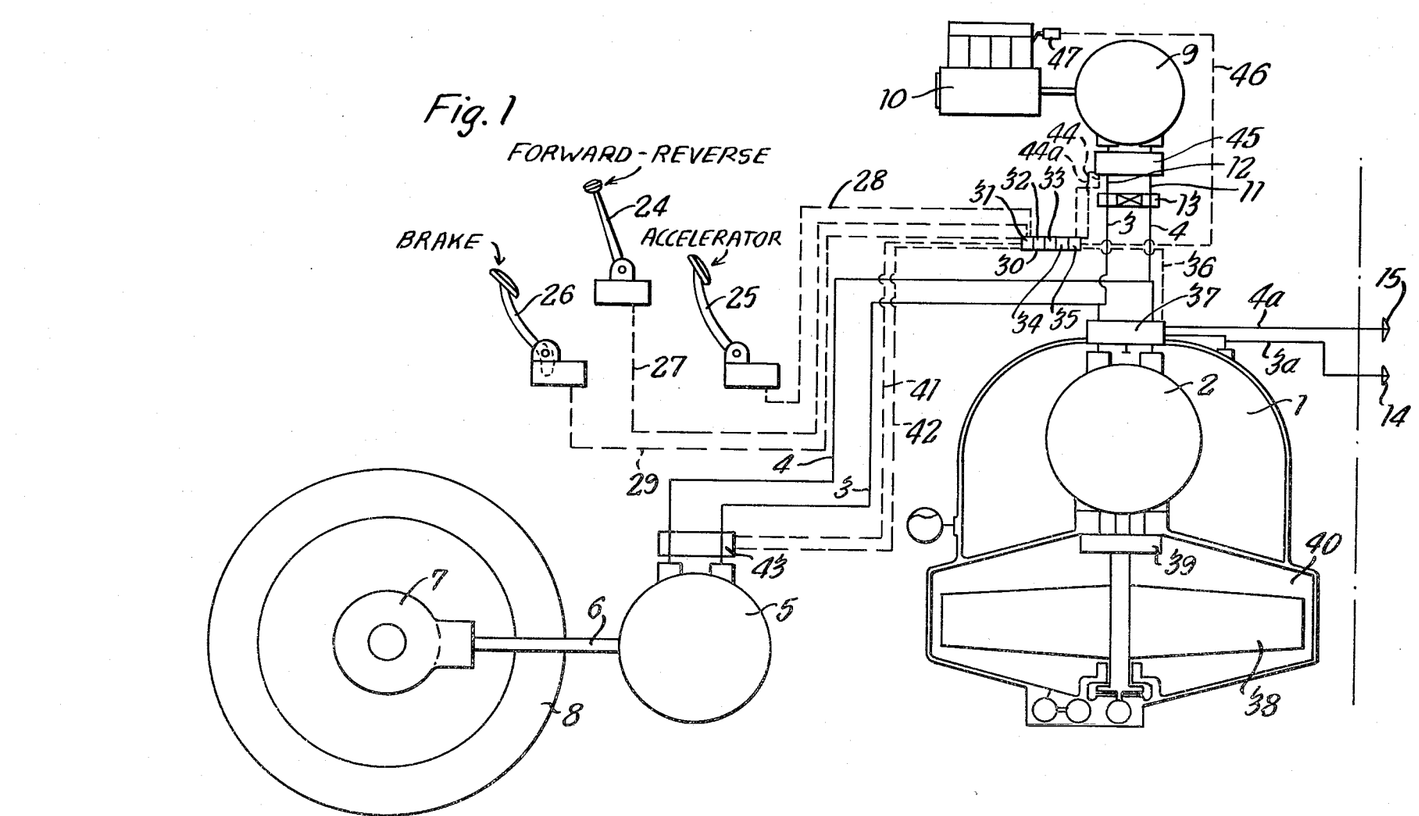
FIGS. 1 and 2 show a flywheel/hydraulic propulsion system as applied to a works vehicle (factory tractor) or fork-lift truck), a city bus, or other vehicle or machine where the flywheel provides the main source of on-board propulsive energy, normally charged from an external source, and the combustion engine, if fitted, perform an ancillary or specialized function.
Figure 2:
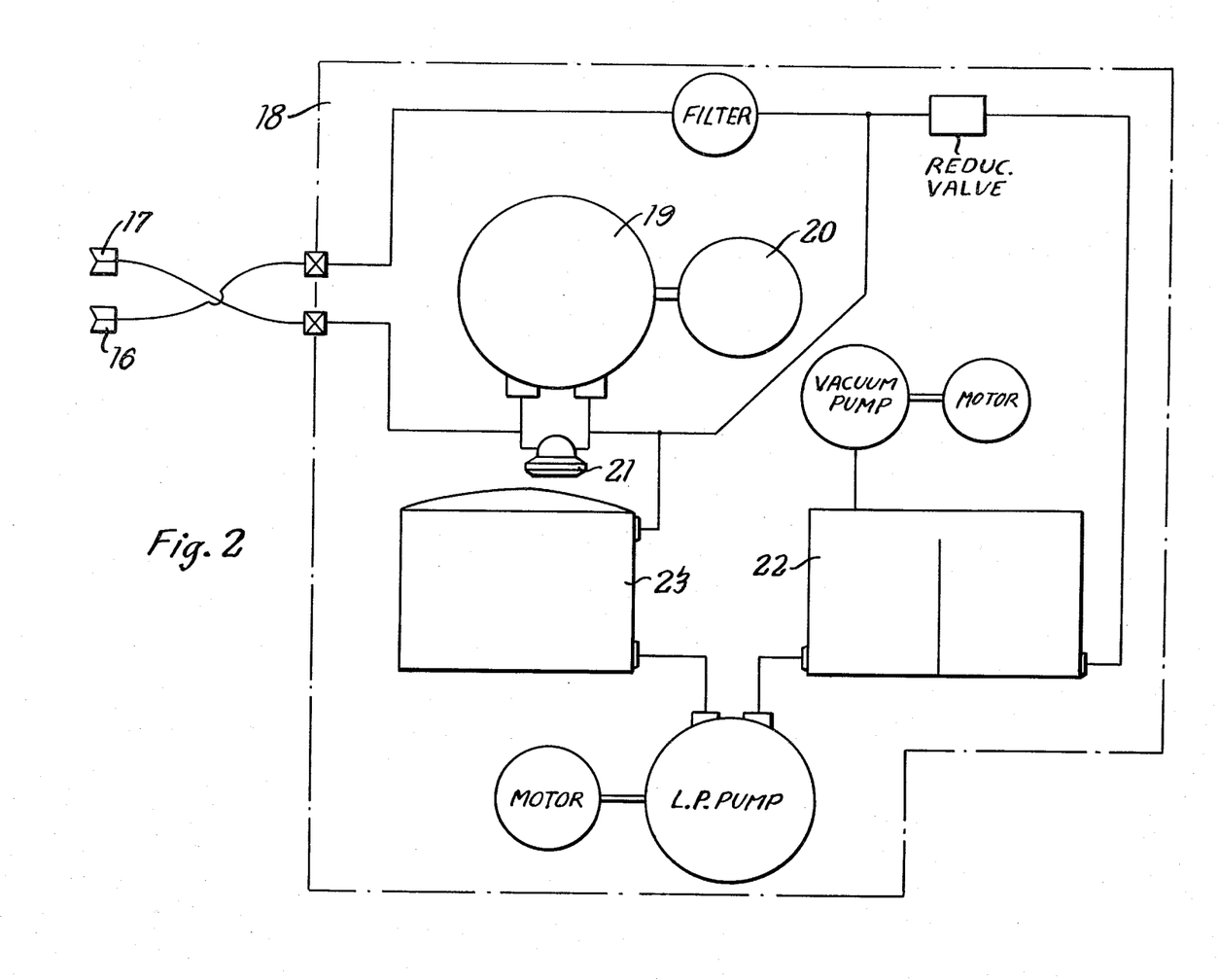

In FIGS. 1 and 2 a fly-wheel hydraulic accumulator 1, which incorporates a pump/motor 2, passes hydraulic power via delivery line 3 and return line 4 to a motor/pump 5 which drives via the propellor drive shaft 6 and the differential final drive 7 the vehicle driving wheels 8. A further pump 9 driven by a combustion engine 10 has delivery 11 and return 12 lines connected into the main delivery and return lines 3, 4 by a self-pilotted change-over valve 13 such that whichever of 3, 4 is at the higher pressure will be connected to the engine-pump delivery 11 and the lower pressure to engine-pump return 12, but if neither is pressured valve 13 will be biassed to connect 11 to main return line 4.

Extensions 3a, 4a of the main delivery and return lines 3, 4 lead to self-sealing quick-connected coupling halves (14, 15 respectively) adapted to engage complementary coupling-halves 16, 17 (FIG. 2) associated with a fixed or mobile service-base hydraulic charging plant 18 powered by a variable hydraulic pump 19 driven by an electric motor 20 or by a combustion engine where more convenient.

A flywheel-hydraulic accumulator 21 similar to unit 1, may be included in the service plant 18 to increase output or decrease electricity peak usage. The service plant 18 should also incorporate an oil conditioner 22 and holding reservoir 23 each with appropriate ancillaries.

On the vehicle, the operator's selector lever 24, accelerator pedal 25 and brake pedal 26 are connected by control lines or links 27, 28, 29 to the controls input integrator 30 incorporating the drive selector valve 31 (FIG. 8), the accelerator signal transforming valve 32 (FIG. 9), the brake signal transforming valve 33 (FIG. 9), the engine fuel actuator 34 and the engine speed-signal amplifier/attenuator 35 which may be similar to that described in my co-pending U.K. patent application No. 29469/74.

From the controls integrator 30, one output signal line or gallery 36 goes to the computing control valve 37 (FIG. 5) in the pump/motor 2 associated with the energy-storage flywheel 38 via the gear train 39 in the evacuated section 40 of the flywheel-hydraulic accumulator 1; two output signal lines 41, 42 go to the computing valve 43 in the wheel-driving motor 5; two output signal lines 44, 44a go to the computing valve 45 of the engine-driven pump 9 and one output actuator line or mechanical link 46 goes to the engine carburettor or other fuel controller 47.

In addition, speed signalling lines link the wheel-driving motors 5, the engine pump 9, and the flywheel-driven pump/motor 2 conveniently, but not necessarily, through the controls integrator 30.

Figure 3:
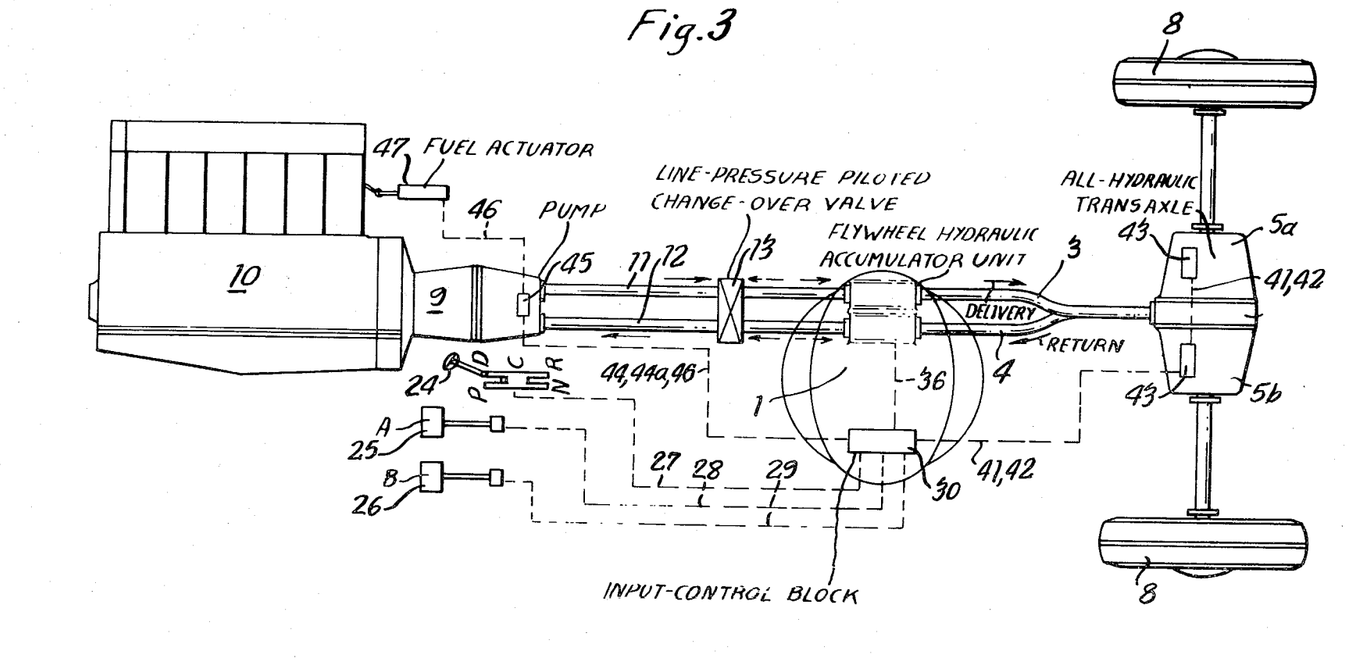
FIG. 3 shows an application to an automobile, road truck or haulage tractor where the combustion engine provides the main source of propulsive energy and the flywheel/hydraulic accumulator offers a purely short-term boost to the hydraulic transmission system.

In FIG. 3 the same numbering has been applied to the elements shown, the only material variation being that the single motor 5, propellor drive shaft 6 and differential final drive 7 are replaced by a pair of motors 5a, 5b each driving its appropriate individual wheel 8.

FIG. 3 having been described fully in my said earlier patent application only carries the elemental numbers shown in FIG. 1.

Figure 4:
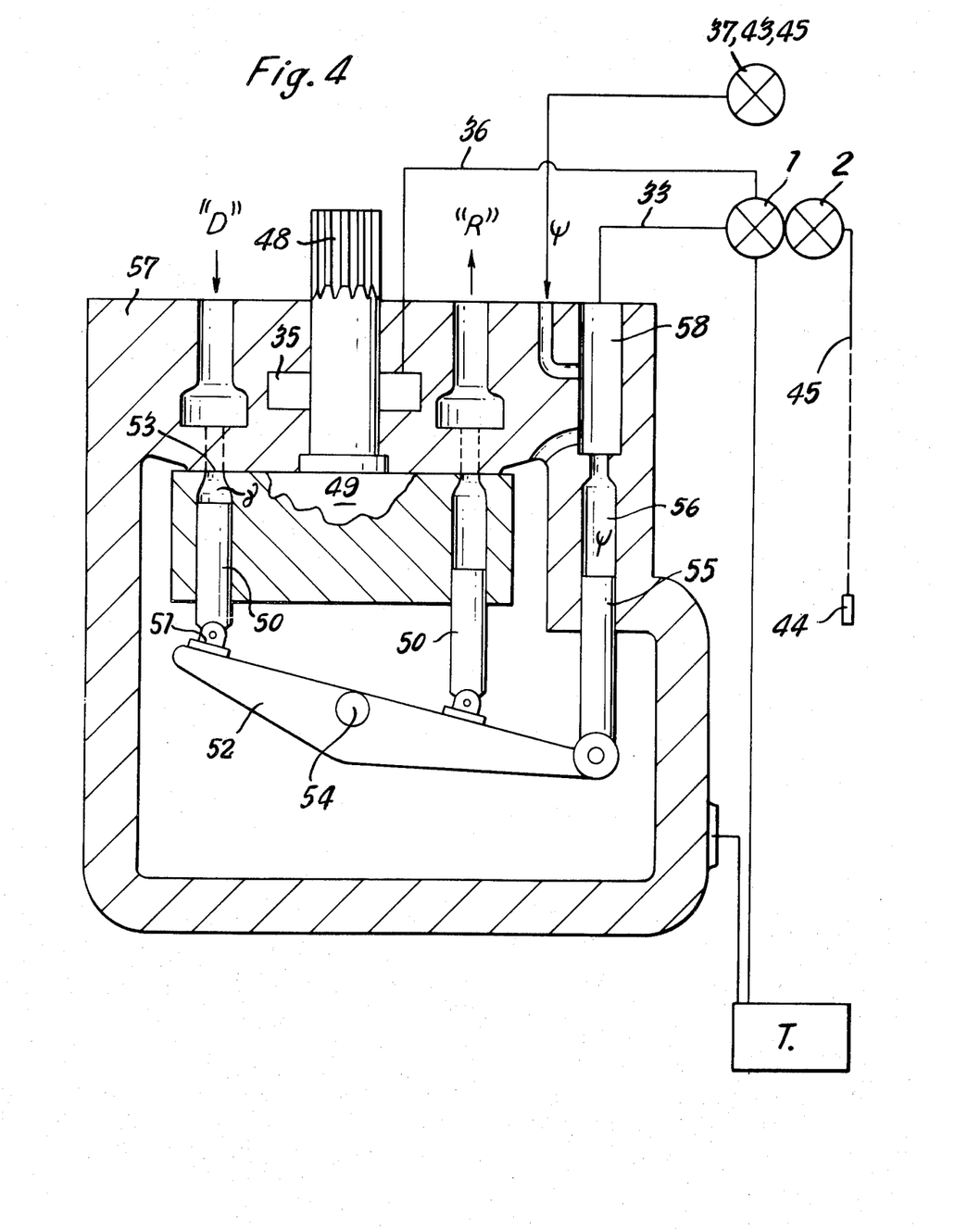
FIG. 4 shows the essentials of a variable hydraulic pump/motor of basic self-zeroing type, being the more convenient to relate with the controlling system.

FIG. 4 can be taken to represent the flywheel driven pump 2, the wheel-driving motor or motors 5, or the engine-driven pump 9. The shaft 48 is directly or indirectly connected to the cylinder barrel 49 carrying a number of axially disposed pistons 50 the ends of which carry slipper-pads 51 sliding on an inclinable swashplate 52. The pistons when pumping develop a pressure or when motoring are supplied with a pressure P which through the port-face 53 affects only those pistons 50 within a particular arc of rotation, such that the summation of these piston loads acting on the swash plate 52 are offset from the inclination pivot point 54 of the swash-plate 52 with effect to reduce the inclination of that plate. An actuating piston 55 sliding in a fixed cylinder 56 of the pump/motor casing 57 serves to counter the piston loads and include the swash-plate 52 when supplied with a control pressure $\Psi$ via the quick-relieving actuator spill valve 58 as described in my co-pending patent application U.K. No. 28323/74, and the computing valve 37, 43, 45 of the appropriate pump or motor 2, 5, 9.

Figure 5:
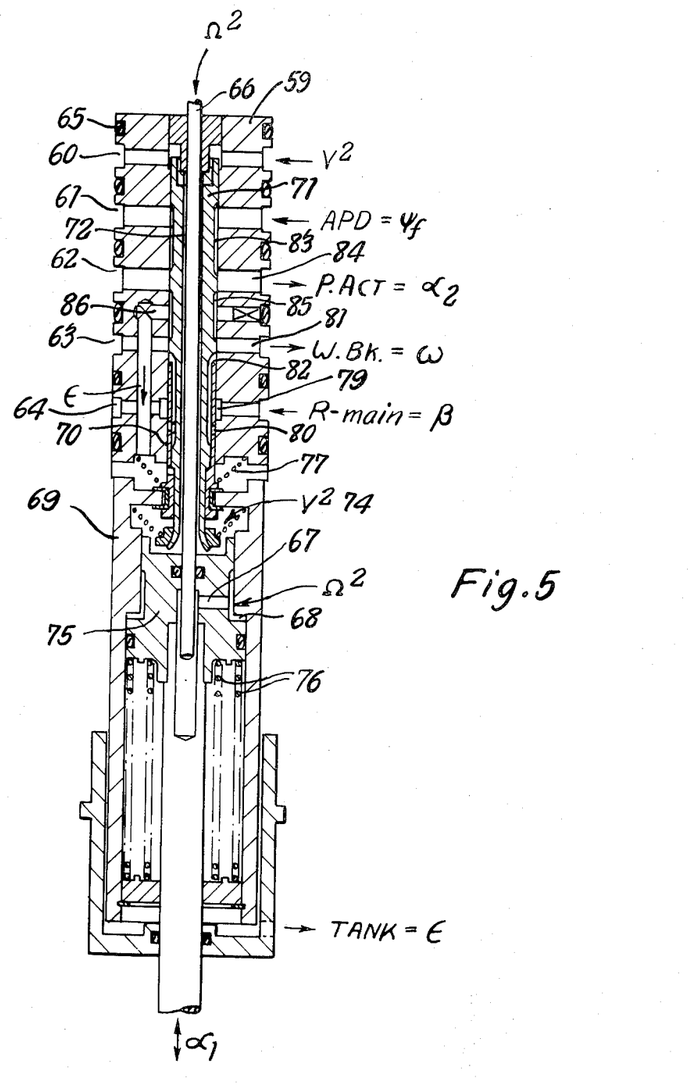

In FIG. 5, showing the computing valve 37 for insertion into the flywheel driven pump/motor 2, the valve body 59 has external annular grooves 60, 61, 62, 63 and 64 between pairs of sealing rings 65 and each is matched to a specific input/output connecting gallery (as FIG. 6) in the pump/motor casing 57, the same applying to the axial catheter pipe 66 which feeds in the self-speed signal ($\Omega^2$) of the flywheel pump/motor 2 via radial hole 67 to the differential area 68 of the analogue pilot cylinder 69 directly connected to the sleeve section 70 of the valve spool 71 which has a through hole 72 to allow passage of the catheter 66 and of the wheel-motor speedsignal ($\nu^2$) introduced at the uppermost external groove 60 and passed to the central area 72 of the analogue pilot cylinder 69, the piston 75 within being fixed to and moving with the swash-inclination feed-back rod ($\alpha_1$).

Calibrated compression springs 76 beneath the piston 75 counter with $\Omega^2$ and $\nu^2$ pressure areas 68, 74 above the piston 75 with effect to move the analogue cylinder 69 and spool-sleeve 70 downwards whereas the summation of the $\Omega^2$ and $\nu^2$ pressure areas 68, 74 have effect to move it upwards against conical bias spring 77. The spool itself 71 passes through the spool-sleeve 70 into the central $\nu^2$ pressure area 74 and is constrained from moving upwards relative to the spool-sleeve 69 by the conical spring 78. When the pump main return 4(FIGS. 1 and 2) is pressured, this $\beta$ pressure communicates via the lowermost external groove 64, internal groove 79, and the holes 80 in the spool-sleeve 70 when in communication, with effect to move the spool 71 upwards relative to the spool-sleeve 70 and the spring 78 such that if the dual upward movement of the spool 71 is sufficient to open radial ports 81 to the spool/sleeve annulus 82 the $\beta$ pressure will be communicated to the next-to-lowermost external groove 63 and thence by the appropriate casting gallery and outside pipeline to the vehicle brake master cylinder servo actuator (not shown) such that the wheel-brakes will be applied to a degree proportional to the $\beta$ pressure.

The next-to-uppermost external groove 61 receives the control pressure $\Psi f$ from the controls integrator 30, and the spool 71, when in a down position, directs it via the reduction in diameter 83, the radial ports 84 and the median external groove 62 to the casing gallery communicating with the spill valve 58(FIG. 4) of the swash actuator 55, 56(FIG. 4).

When the spool 71 is moved upwards it opens port 84 to the reduction in diameter 85 and via internal port 86 to tank drain $\epsilon$, so that $\Psi$ is withdrawn from the actuator spill-valve 58(FIG. 4) thus allowing the swash plate 52(FIG. 4) to reduce inclination with consequent decrease in stroke-displacement of the pump 2.

Figure 6:
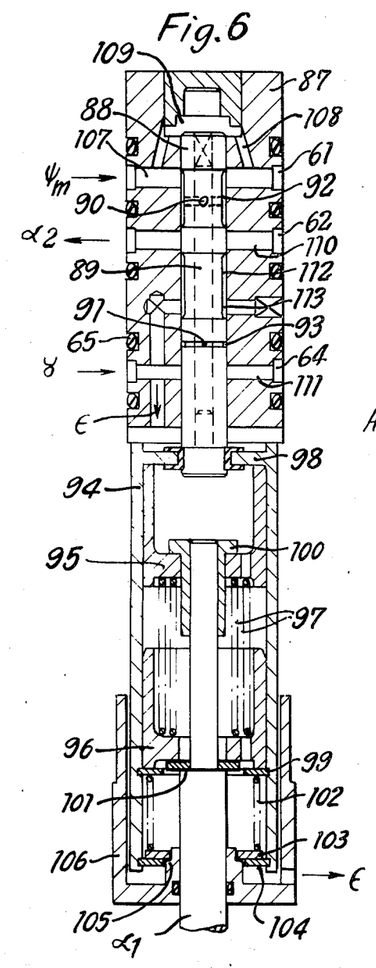
FIG. 6 shows the computing valve as inserted in the wheel or load-driving hydraulic motor/pump.

In the wheel-motor computing valve 43 shown in FIG. 6, the valve body 87 is closely similar to the valve body 59(FIG. 5) except that the uppermost 60 and next-to-lowermost 63 external grooves of the latter are deleted as is the catheter tube 66. The valve spool 88 although bored through is end plugged to leave an obturated internal gallery 89 communicating via radial holes (90, 91) to the uppermost reduction in diameter 92 and the lowermost narrow reductions in diameter 93 of the spool 88.

The analogue cylinder 94 has no hydraulic internal connotations and is simply spring controlled having two slideable "pistons", upper 95 and lower 96 separated by calibrated compression springs 97 against the upper cylinder closure 98 and a circlip 99 lowerdown. The swash-inclination feed-back rod ($\alpha_1$) is shouldered above 100 and below 101 the pistons (95, 96) so that its movement downwards or upwards will lift one piston 95 or the other 96 off the cylinder abutments 98, 99 against the compression of the springs 97.

The lowermost part of the analogue cylinder 95 contains a further calibrated spring 102 abutting the circlip 99 above and a free washer 103 below resting on a circlip 104 just within the open end of the cylinder 94. This washer 193 when resting on a shouldered boss 105 where the feed-back rod ($\alpha_1$) passes through the cover 106 resists the downwards movement of the analogue cylinder 94 through the spring 102.

The uppermost external groove 61 is connected by radial holes 107 to the reduction area 92 of the spool 88, and by upwardly directed holes 108 to the closured area 109 of the module body 87, so that spool 88 will be biassed downward by the incoming command signal pressure $\Psi$, and/or by the feed-back rod ($\alpha_1$) and springs 97 as appropriate, thus opening spool reduction 92 to radial ports 110 associated with external groove 62 and therefore connecting $\Psi_m$ to $\alpha_2$, spill valve 58 and swash-plate actuator 55, 56. Further downwards movement of spool 88 cuts off ports 107 and therefore $\Psi_m$, but opens radial ports 111 of external groove 64 carrying constant pressure $\delta$ to the narrow spool annulus 93 and via holes 91, internal spool gallery 89, radial holes 90 and spool reduction 92 to ports 110, external groove 62 to the spill valve 58 and actuator 55, 56 so preventing the swash-plate 52 (FIG. 4) from going overcenter beyond zero inclination, yet cutting off $\delta$ immediately as the swash inclination becomes positive again.

If the constant pressure $\delta$ is diverted elsewhere e.g. by the operator's selector valve 31, the swash plate 52 will be forced fully overcenter and the motor shaft 48 will be driven in reverse rotation.

If the spool 88 is moved upwards, external groove 62 and port 110 will be opened to spool reduction 112 to the internal port 113 and so to tank drain $\epsilon$.

The engine-driven-pump computing valve 45 shown detailed in FIG. 7, again has: a valve body 114 similar to the body 59 of FIG. 5, but without the uppermost and next-to-lowermost external grooves 60, 63; a valve spool 115 with a through bore 72 for free passage of the catheter tube 66 and transfer off command pressure $\Psi_p$ entering at groove 61, port 107 and orifice 116 to the analogue pilot cylinder 94, the command pressure $\Psi_p$ going to the area above the piston 117 bounded by the cylinder closure 98, and the catheter 66 carries the modified engine-pump speed signal pressure (shown as $\sqrt{v^2}$) through a sealed hole 118 in piston 117 and axial and radial holes 119, 120 in piston rod 121 to the area under piston 117 bounded by the lower cylinder closure 122 located by circlip 104 just within the open end of cylinder 94. A calibrated spring 123 separates piston 117 and end-closure 122. The piston rod 121 passes through a seal 124 in end-closure 126 and through a clearance ring 125 in end-closure 122, terminating in a snap-joint 127 for attachment to the swash-inclination feed-back rod ($\alpha_2$ not shown).

Figure 7:
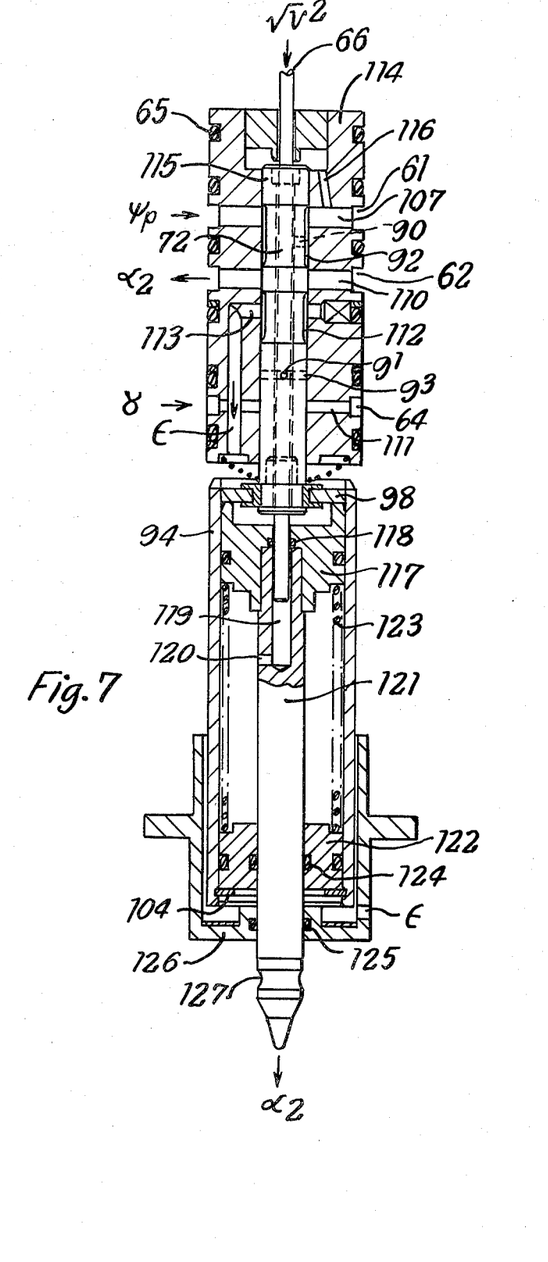
FIG. 7 the computing valve in the combustion engine driven pump of an automobile.

The valve spool 115 has diametrally reduced areas 92, 112 such that if the spool 115 is moved downward or upward the actuative outlet ports 110, 62 are no longer obturated by the full spool diameter but will be connected respectively to the command signal $\Psi_p$) ports 61, 107 or to the internal drainage port (113, $\epsilon$).

Figure 10:
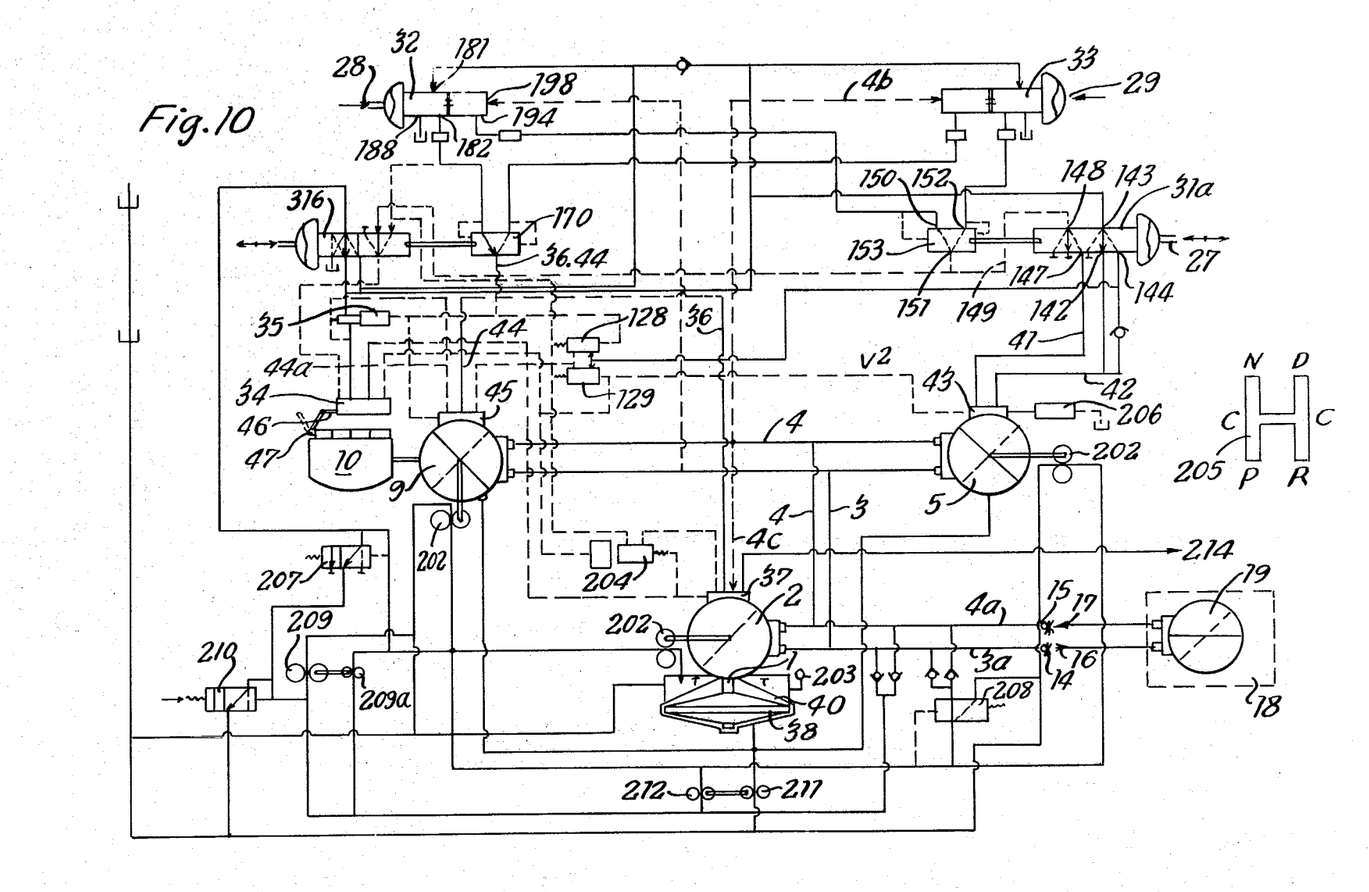
FIG. 10 shows the hydraulic power and control circuits interconnecting the various elemental units.

When the engine-pump 9 is used in association with the self-pilot change-over valve 13(FIGS. 1, 2 and 3) its swash-plate 52 will have a mechanical zero-inclination stop, but for some applications the change-over valve 13 may be deleted in favour of an overcenter pump 9 as shown in the controls circuit (FIG. 10). For this case the engine-pump computing valve 45 will have an external groove 64 and radial ports 111 for entry of constant pressure $\delta$ to the narrow spool annulus 93, hole 91, axial spool bore 72, radial hole 90, spool reduction 92 and so via outlet ports 110 and groove 62 to the actuator spill valve 58 and actuating cylinder 56 so preventing over-center swash-inclination whenever $\delta$ is introduced by the low-engine speed 128 and low vehicle speed 129 valves (FIG. 10), to obviate engine stalling at stops.

Figure 5A:
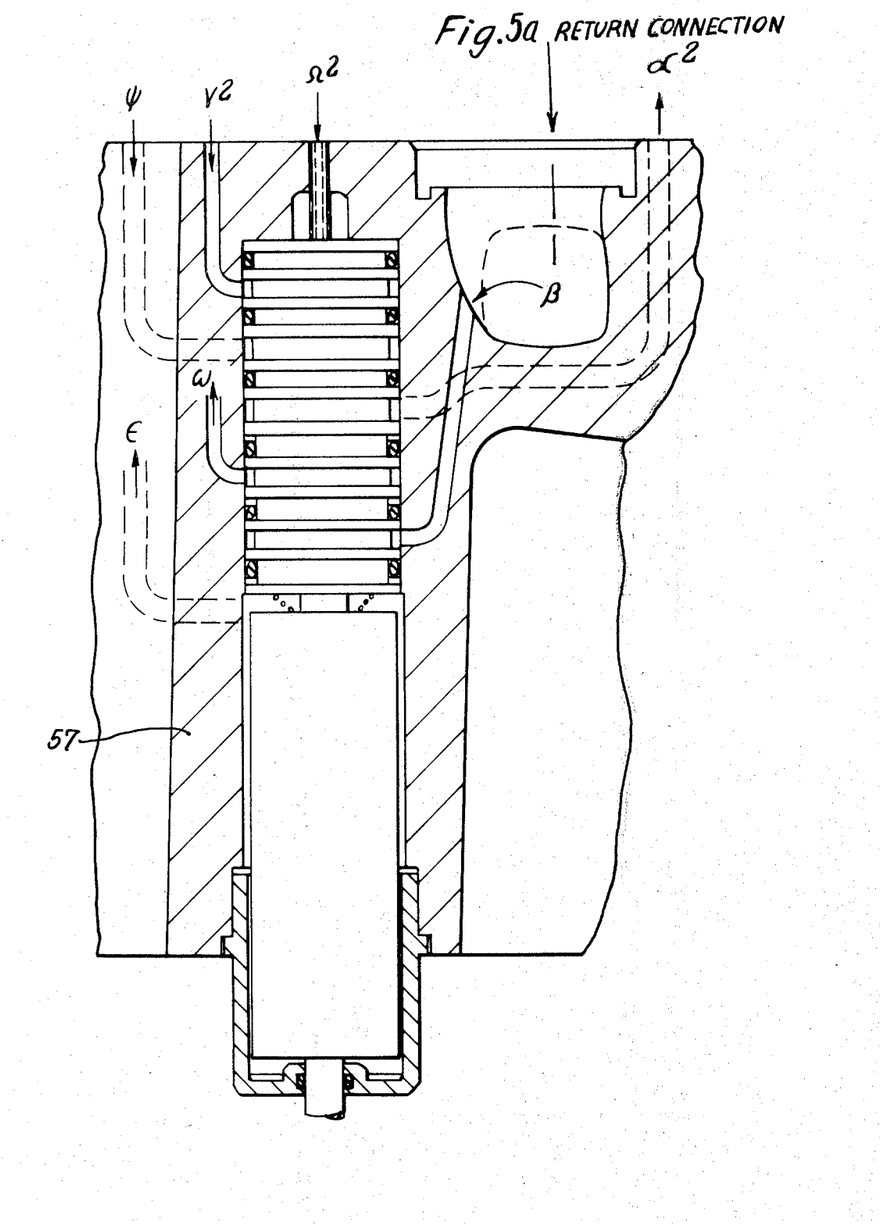
Figure 8:
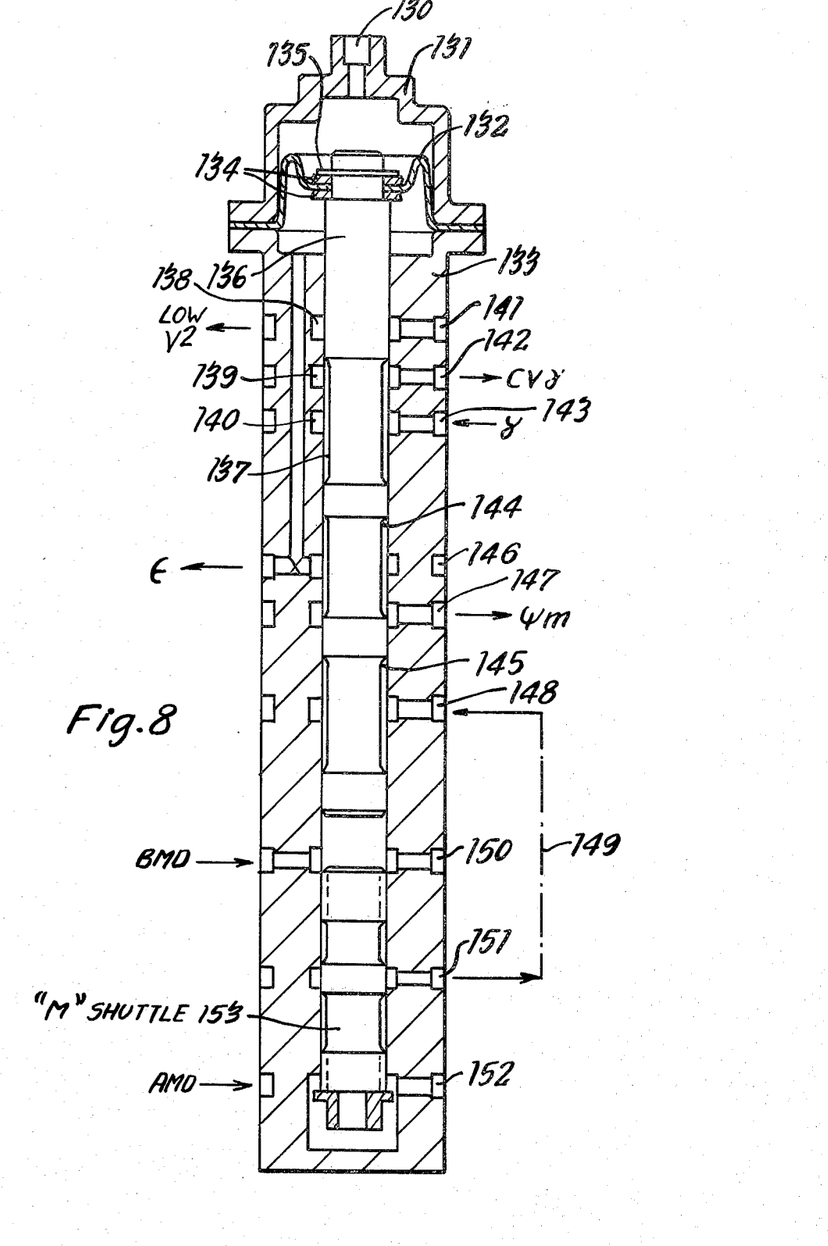
FIGS. 8 and 8a shows the operator's drive-selector valve(s)
Figure 8A:
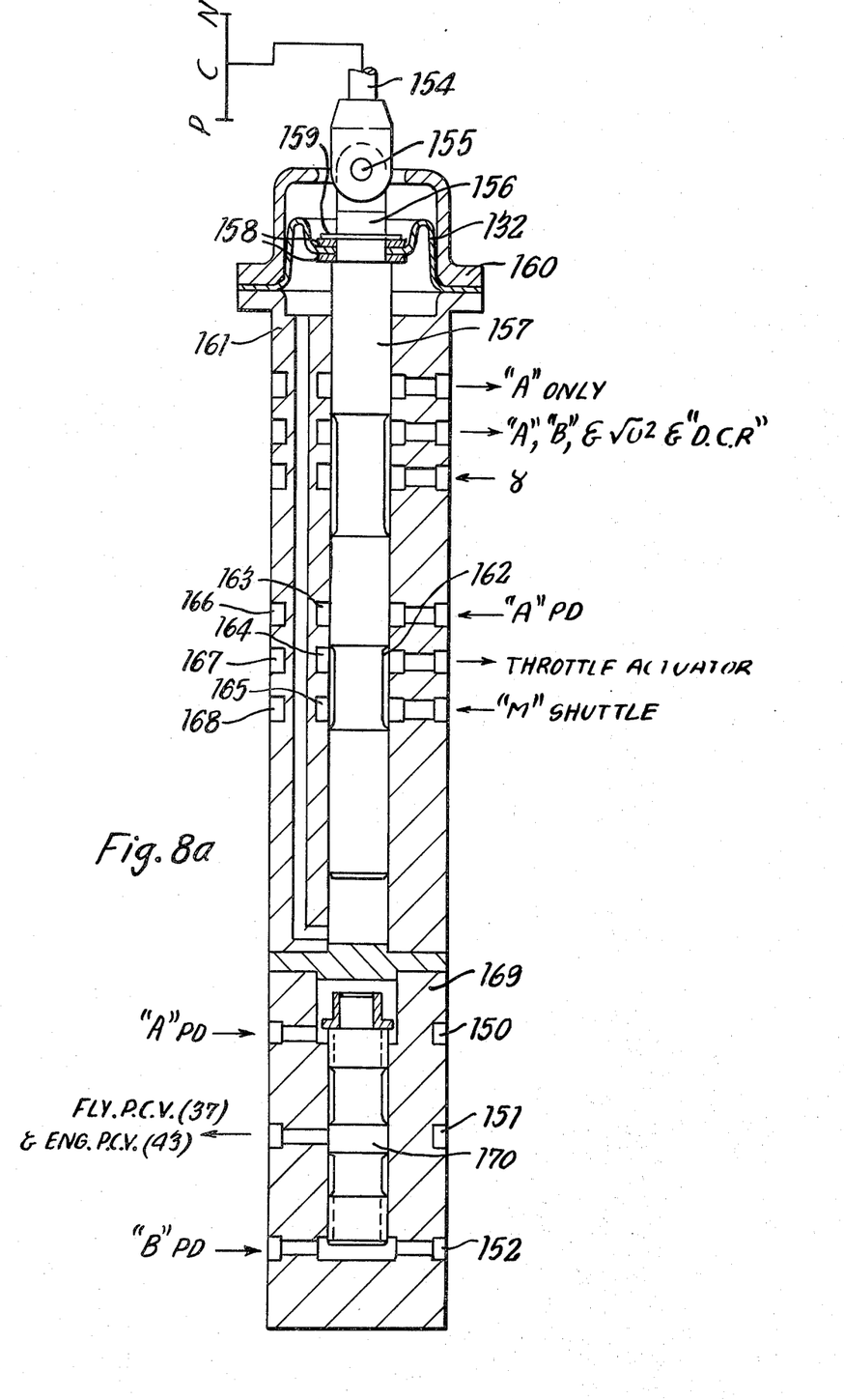

FIG. 8, 8a shows the twin selector valves, each embodying a free shuttle and having ports for passing signals designated AMD and BMD. Thus, taking first FIG. 8 the "Drive-Charge-Reverse" selector, shown with the alternative pneumatic or hydraulic operator-remote connection 130 in the end cover 131 housing the hermetic sealing diaphragm piston 132 in conjunction with modular body 133 intended for insertion into a casing (not shown) having communicating passages or connections as described in my co-pending patent application U.K. No. 29689/73 and as shown in FIG. 5a.

The center of diaphragm 132 is secured by washers 134 and a circlip 135 to valve spool 136 which performs dual functions, that nearest the diaphragm end having a single reduction in diameter 137 for cooperation with three ports 138, 139, 140 each associated with an external communication groove 141, 142, 143 the lowest of which receives controlled constant pressure $\delta$ for distribution to the motor computing valve 43 and other items. The second function of the valve spool 136 has two reductions in diameter 144, 145 of which the upper 144 drains $\Psi_m$ from computing valve 43 to $\epsilon$, and the lower 145, when "Drive" is selected, feeds $\Psi_m$ from the lowest of three external communicating grooves 146, 147, 148 to the middle groove 147 and thence to the motor computing valve 43.

The lowest groove 148 receives $\Psi_m$ via a casing gallery 149 from the middle (output) of three further external communicating grooves 150, 151, 152 which services the free shuttling spool 153 which accepts whichever of AMD or BMD is pressured and transfers this to the output groove 151.

The other selector valve FIG. 8a accepts a mechanical operator remote selector connection 154 via the clevis pin 155 to the free end 156 of a valve spool 157 external of the hermetic sealing diaphragm 132 located on the spool 157 by a pair of washers 158 and a circlip 159. The periphery of diaphragm 132 is clamped between a shield cover 160 and a modular-insert body 161. The upper function of the dual function spool 157 is identical with that of spool 136 (FIG. 8) and the same elemental annotations apply.

The lower function is directed by a reduction in diameter 162 of spool 157 which co-operates with three ports 163, 164, 165 associated respectively with three external communication grooves 166, 167, 168 such that movement of the selector spool 157 upwards will cause APD to be directed to throttle Actuator, the position as shown directs M Shuttle to throttle Actuator, and movement downwards closes everything. A coaxial extension 169 of the modular body 161 carries a free shuttling spool 170 which has identical servicing grooves and ports to the M shuttle spool 153 and has annotations accordingly. This shuttle valve, the P shuttle, chooses between APD from the Acceleration command transducer (FIG. 9) and BMD from the braking transducer, according to whichever is pressured, and transmits the result to the flywheel-pump computing valve 37 and the engine-pump computing valve 45.

Figure 9:
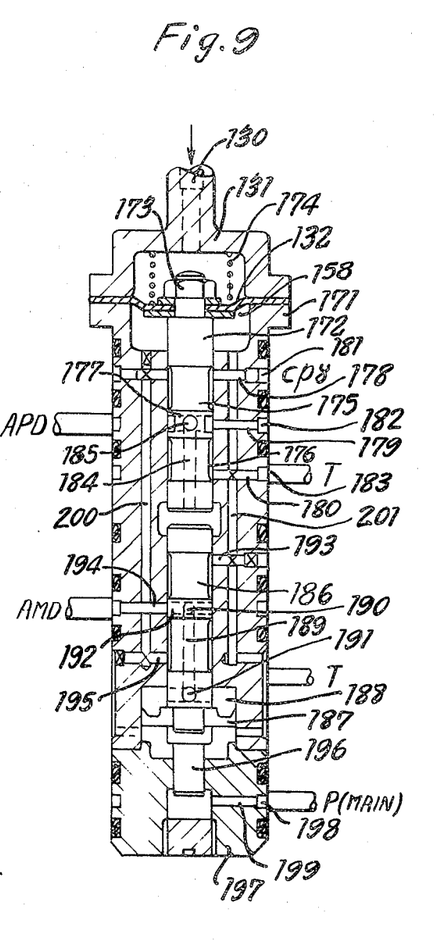
FIG. 9 shows the operator's acceleration signaltransforming valve (that for the braking signal being constructionally similar)

The accelerator command signal transforming transducer valve of FIG. 9 is adaptable to any type of signal input but as shown has a push-in connection 130 for pneumatic or hydraulic input, from the operator's accelerator pedal 25, into the top cover 131 which locates the diaphragm piston 132 with the modular body 171. The diaphragm 132 is secured at its center to a valve spool 172 by washers 158 and nut 173 and is loaded by a spring 174 to partly counter any backing pressure peculiar to the application system.

The spool 172 has two reductions in diameter 175, 176 either side of a central land 177 and these co-operate with three ports 178, 179, 180 each associated with an external communication groove 181, 182, 183 such that without accelerator signal input the residual backing pressure below the diaphragm 132 will move the spool 172 upwards so that port 179 will be brought by 176 into communication with port 180 leading to tank drain. But any accelerate signal will depress diaphragm 132 and spool 172 so that reduced diameter 175 will direct the controlled constant pressure δ from groove 181 and port 178 to port 176 and groove 182 and so as APD to the parking valve and P-shuttle (FIG. 8a). However, an internal drill way 184 to the end of spool 172 remote from diaphragm 132 connects with a radial hole 185 in the central land 177 of spool 172 such that the pressure to be passed to APD by port 179 is transmitted to the end face of spool 172 as a precise pressure-ratio counter-balance of the accelerator signal pressure applied above the diaphragm 132.

A coaxial floating spool 186 has one end closely justaposed to the free end of primary spool 172 and subject to the same counter balance pressure, whilst the other end is fixed to a larger diameter piston 187 sliding in an end-chamber 188 of the modular body 171. An axial drill way 189 within the floating spool 186 and two terminating radial drillways 190, 191 the former 190 at the central land 192 of spool 186 and the latter 191 emanating within the end-chamber 188 ensure that any pressure generated by interaction of spool 186 with the three ports 193, 194, 195 will be faithfully reproduced at the piston 187 which is loaded at the face remote from chamber 188 by a slug-ram 196 sliding in an end-body 197 extension of modular body 171 and pressured from communicating groove 198 and hole 199 by the pump delivery pressure P-main. As a result the pressure behind piston 187 and so at AMD will be a function of P-main at a pressure ratio governed by the areas of piston 187 and slug-ram 196 less a correction for the counterbalance stabilizing pressure acting on the other end of spool 186.

An internal oilway 200 in the modular body 171 distributes constant pressure δ from port 178 to port 195, and another oilway 201 interconnects both the drain-ports 180, 193 and all drainage areas with a common outlet T.

The operator's brake signal transducer 33 is an exact replica of the accelerate transducer 32 above, excepting a minute difference in the diametral dimensioning of the slug-ram 196 and spring 174 strength.

The controls circuit FIG. 10 is annotated with all the appropriate foregoing numbers, but also shows necessary or permissible anxillaries such as miniscule control-power gear-pumps 202 on each of the main-power pump or motor units 2, 9, 19, an air-excluding pressured zero-rullage expansion diaphragm chamber 203, a low flywheel speed ($\Omega^2$) booster 204 to provide an effective charge-activating signal at low flywheel speeds though the same result is sometimes more effectively achieved by a speed-signal amplifier-attenuater (Amp $\sqrt{\Omega^2}$) similar to 35 and as described in my co-pending U.K. patent application No. 29469/74.

The operator's drive selector lever 24 (FIGS. 1, 2 and 3) may, instead of the conventional linear "automatic" travel, be adapted to the older convention H gate 205, the cross-bar of the H being devoted to a non-driving "charge" regime for flywheel accumulator replenishment by the on-board combustion engine 10 or by a service plant 18 (FIG. 2).

The wheel-slip controller 206 as described in my co-pending patent application U.K. No. 34907/73 is a useful anxillary, but the constant pressure δ relief valve 207 and the sub-constant mains replenisher 208 are respectively necessary and advisable. The closed circuit make-up pump 209 with gear-motor drive 109a and relieving controller 210 are necessary only for high-specific power systems, but the vacuum/scavenge pump 211 driven by gear motor 212 fulfils a necessary requirement of high-speed energy-storage flywheel 38.

In operation, assuming first that the whole system is dead with the operator's selector lever 24 at "Park" in the selector gate 205. The engine starter may be actuated in this position and with engine 10 running the selector lever 24 moved either to Neutral to check for stable running, to charge where, with the vehicle still stationary, and brake pedal 26 pressed the engine 10 will be accelerated so that its power pump 9 will in the absence of actuator pressure ($\Psi_p$) go over-center immediately raising a pressure in the return line 4, 4b so that the brake signal transducer 33 will provide a proportional secondary output via P shuttle 170 to both the flywheel pump computing valve 37 and the engine-pump computing valve 45 with effect to arrest the over-centre movement of the engine pump at a pressure determined by the brake pedal effort, and to instruct the flywheel pump to adopt full displacement as a motor.

As the flywheel pump 2 commences to motor, rotating the flywheel 38, its fluid acceptance increases proportionally with speed and the engine-pump 9 must follow up by increasing over-center displacement and/or speed to maintain pressure in 4, 4a and consequently from BPD through P, shuttle 170 and 44 to computing valve 45 where it is being countered by the speed pressure from the signal amplifier 35 arriving via 44a. This continues until the throttle actuator 34, which has achieved full power balance between the brake transducer 33 primary output arriving via M shuttle 153, selector secondary 31b and the amplified speed signal, receives the flywheel pump speed signal ($\Psi^2$) with any corresponding vehicle speed signal ($\nu^2$) such that the throttle actuator is overridden to reduce engine power and so the pressure in 4, 4b and by recirculatory feedback the BMD pressure which in the engine pump computing valve is increasingly overcome by the engine speed amplified pressure, in spite of decreasing engine speed. Meantime the decreasing pressure $\Psi_f$ arriving via 4c at the flywheel pump computing valve 37 reduces the motoring displacement and therefore the flywheel driving torque of the flywheel pump 2 eventually all stabilizing at the minimal torque and power to hold the system at maximum accumulated energy.

Should some minor malfunction allow the charging to continue beyond the above predetermined maximum energy, at a predetermined excess of energy (i.e. flywheel over-speed) the flywheel pump speed signal ($\Psi^2$) arriving at the flywheel-pump computing valve 37 will have effect to cut off the pump actuator command activating pressure ($\Psi_f$) so reducing the stroke-displacement to zero. However, it must be appreciated that the rate, depth and period of charge are always under the discretionary control of the operator, and it is even permissible to engage Reverse or Drive and start away without first charging the flywheel accumulator which will automatically gain energy whenever the vehicle is braked or allowed to overrun.

When Drive is selected and the accelerator pressed, the accelerate transduced pressure APD Is transmitted via selector valve 31b to the throttle actuator 34 and via P shuttle 170 to the engine pump computing valve 45 with effect to reduce stroke displacement and to the flywheel pump computing valve 37 with effect to urge an increase of stroke-displacement thereby raising the delivery pressure 3, 3b and therefore the feedback secondary pressure AMD from the accelerate transducer 32 via M shuttle 153, selector valve 31a and line 41 to the wheel-motor computing valve 43 with effect to increase stroke-displacement and therefore driving torque and fluid acceptance proportional to both displacement and to the increasing driving speed as the vehicle accelerates.

Meanwhile, the flywheel pump 2 responds with increasing delivery to maintain the system pressure demanded by the operator command $\Psi_f$. The engine 10 meantime is precluded from responding to the operator's command so long as $\Omega^2$ is near maximum and $\nu^2$ near minimum, but the increasing energy transfer from $\Omega^2$ to $\nu^2$ will gradually allow the engine 10 to make its contribution to meeting the vehicle rolling, windage and parasitic losses, yet without concern for its acceleration.

However, having reached a chosen cruising speed, the flywheel, having fallen in speed to a predetermined relationship compared with vehicle speed, will cease to provide pumped hydraulic pressure due to speed integration in its pump computing valve and will cease to inhibit the engine throttle at the cruise opening by speed differentiation in the throttle actuator.

When the accelerator pedal is released, cutting off APD, the throttle actuator closes, and the flywheel pump reduces stroke (if it was previously in "Acceleration"), but the engine pump is urged to increase stroke displacement by the excess of $\sqrt{\nu^2}$ over $\Psi_p$. Before the wheel-drive motor can lose stroke it will momentarily pump the return line 4 and 4b on brake transducer 33 will use this feed back, in conjunction with its overrun load spring (as 174) to provide a minimal BPD via the P shuttle 170 both to the engine pump computing valve 45 and to the flywheel pump computing valve 37 to provide some stroke displacement so that it may be regeneratively motored, if its speed relationship $\Omega^2$ to $\nu^2$ demands it, otherwise the engine 10 will be motored by the minimal brake transducer primary signal BMD stroking the drive motor 5.

If the brake pedal is pressed, the above reactions are increased in effect, thus the motor 5 increases its displacement acting as a pump, the engine pump 9 displacement decreases by excess of $\Psi_p$ over $\sqrt{\nu^2}$ and the flywheel pump will vary its stroke displacement in line with the return acceptance requirement whilst maintaining the system return pressure demanded by the degree of brake pedal pressure. The friction brakes on the nondriven wheels will not normally be applied in the initial pedal pressure range, so as to allow optimum recuperation of energy. However, if during regenerative braking, the flywheel speed reaches its prescribed relationship with the obtaining vehicle and drive-motor speed, the flywheel pump computing valve 37 will reduce or fully withdraw the command actuating pressure to the spill valve 58 and so of the stroke-displacement actuator 56 and at the same time send to the vehicle wheel-brake master cylinder servo 214 a pressure equal to system return pressure 4 commanded by the operator. This ensures that, when descending a long incline, the flywheel will not be over-charged/over-speeded.

I claim:

1. An energy-accumulating system for use in a vehicle; said system including:
   a flywheel (38) for rotating stored energy;
   a first hydraulic pump/motor (2) for rotating with said flywheel (38);
   a ground engaging wheel (8);
   a second hydraulic pump/motor (5) for rotating with said wheel;
   control means (30) responsive to signals applied thereto for selectively controlling the flow of fluid between said first and second hydraulic pump/motors so that the energy stored in said flywheel (38) can be controlled in relationship to an operator control and the speed of rotation of said ground engaging wheel (8).

2. The system as defined in claim 1, also including:
   an operator control device (25) for providing a first signal to said control means (30); and
   means (43) responsive to the speed of rotation of said ground engaging wheel (8) for providing a second signal to said control means (30).

3. The system as defined in claim 2, also including:
   a second operator control device (26) for providing a third signal to said control means (30);
   said first operator control device (25) being an accelerator and said second operator control device (26) being a brake.

4. The system as defined in claim 3 in which said control means is a computing hydraulic valve (30).

* * * * *

UNITED STATES PATENT OFFICE
CERTIFICATE OF CORRECTION

Patent No. 3,910,043  Dated October 7, 1975

Inventor(s) Robert Cecil Clerk

It is certified that error appears in the above-identified patent and that said Letters Patent are hereby corrected as shown below:

Column 4, line 7, the word "include" should read -- incline --.

Column 9, line 25, the symbol "$(\Psi^2)$" should read -- $(\Omega^2)$ --.

Signed and Sealed this sixth Day of January 1976

[SEAL]

Attest:

RUTH C. MASON
*Attesting Officer*

C. MARSHALL DANN
*Commissioner of Patents and Trademarks*